(12) United States Patent
Lopez et al.

(10) Patent No.: US 7,269,886 B2
(45) Date of Patent: Sep. 18, 2007

(54) LADDER STATION SUPPORT ASSEMBLY

(75) Inventors: Rafael C. Lopez, Anaheim, CA (US); Chin Chu Yeit, Monterey Park, CA (US)

(73) Assignee: 3 Day Blinds, Inc., Anaheim, CA (US)

( * ) Notice: Subject to any disclaimer, the term of this patent is extended or adjusted under 35 U.S.C. 154(b) by 50 days.

(21) Appl. No.: 10/734,952

(22) Filed: Dec. 12, 2003

(65) Prior Publication Data
US 2005/0125975 A1    Jun. 16, 2005

(51) Int. Cl.
B23Q 3/00    (2006.01)
B23Q 1/25    (2006.01)

(52) U.S. Cl. .................. 29/281.1; 29/24.5; 29/559; 269/37; 269/55; 269/76; 269/909

(58) Field of Classification Search .......... 29/24.5, 29/428, 434, 525.11, 525.01, 281.1, 559; 269/9, 37, 45, 76, 55, 296, 289 R, 909, 43
See application file for complete search history.

(56) References Cited

U.S. PATENT DOCUMENTS

| | | | | |
|---|---|---|---|---|
| 2,879,059 A | * | 3/1959 | Sandefur ................ | 269/17 |
| 3,653,115 A | * | 4/1972 | Perkins ................ | 29/237 |
| 4,074,897 A | * | 2/1978 | Behn ................... | 269/43 |
| 4,525,907 A | * | 7/1985 | Tachikawa ............. | 29/24.5 |
| 4,823,449 A | | 4/1989 | Chang | |
| 4,949,944 A | * | 8/1990 | Groff, Sr. ............. | 269/45 |
| 5,333,365 A | | 8/1994 | Marocco et al. | |
| 5,349,730 A | | 9/1994 | Anderson et al. | |
| 5,567,208 A | | 10/1996 | Larsson et al. | |
| 5,720,087 A | | 2/1998 | Rasmussen | |
| 5,799,557 A | | 9/1998 | Wang | |
| 5,816,126 A | | 10/1998 | Pluber | |
| 5,826,317 A | | 10/1998 | van Oostrom et al. | |
| 6,003,218 A | | 12/1999 | Schumann et al. | |
| 6,550,128 B1 | * | 4/2003 | Lorenz ................ | 29/464 |

\* cited by examiner

Primary Examiner—Jermie E. Cozart
(74) Attorney, Agent, or Firm—Rutan & Tucker LLP

(57) ABSTRACT

A ladder station supporting device is provided which includes an upper holder assembly having an upper mounting body and a first vertically-oriented holder rotatably fastened to the upper mounting body; a lower holder assembly having a lower mounting body and a second vertically-oriented holder rotatably fastened to the lower mounting body; and a vertically-oriented articulation rod interconnecting the upper and lower holder assemblies, wherein the upper holder assembly may be adjustably positioned along an axis defined by the articulation rod.

16 Claims, 7 Drawing Sheets

LADDER STATION SUPPORT ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

1. Field of the Invention

The present invention is related to window blind manufacturing equipment. In particular, the present invention relates to a ladder station support assembly that is a subcomponent of a modular assembly station which is utilized for assembling (i.e., stacking) a plurality of slats for window blind units.

2. Background of the Invention

The automation of window blind construction has been advanced through the development of modular assembly stations for cutting and assembling a plurality of slats for window blind units. One aspect of manufacturing blinds is the process of inserting each slat into a plurality of ladder-string openings. When the slats are stacked, at least two symmetrically placed ladder-strings provide support for the slats as the slats are cradled between the rungs of the ladder-strings. To accomplish this task, the modular assembly stations utilize a ladder-string applicator which typically includes a U-shaped space presenter housing having a plurality of pairs of opposing slat holders or spring clip ledges which are utilized to support the slats once the slats have been inserted into the ladder-string spaces and stacked.

This blind manufacturing process is best illustrated in U.S. Pat. No. 6,003,218 to Schumann et al., entitled "Apparatus For Cutting and Assembling Slats For Window Blind Units", subject matter of which is incorporated herein by reference. Schumann et al. teaches a modular assembly station for slotting and stringedly assembling a plurality of window blind units. The assembly station includes a ladder-string applicator in a lateral spaced relationship and in alignment to a U-shaped space presenter housing having an entrance chamber for receiving a slat. A conveyor is provided for receiving a slat and laterally advancing it into the entrance chamber and ladder-string applicator. The conveyor includes a pusher that advances the slat through an elongated channel positioned in alignment with the entrance chamber of the U-shaped space presenter housing of the ladder-string applicator. Thereafter, the slat within the channel is longitudinally advanced by the pusher into the entrance chamber. Concurrently, one or more ladder spaces of respectively one or more ladder-strings are presented in the entrance chamber and the slat is positioned within the ladder spaces. Once inserted within the space of the ladder-string, the slat is lifted by raising the elongate channel until the slat passes through opposing holders or spring clip ledges disposed at the top of the U-shaped space presenter housing of the ladder-string applicator. Once passed through the slot holders, the elongated channel is longitudinally extracted from the U-shaped space presenter housing leaving the slot resting on the top of the holders. The elongated channel is then lowered to its original position to await to be reinserted into the entrance chamber again and to await entry of the next slat.

Another existing design for a ladder station support assembly is a U-shaped ladder station support assembly which features a pair of opposing left and right slat holders (see FIGS. 1–6). The pair of opposing left and right slat holders allow the stacking process to be performed by two elongated channels, instead of just one elongated channel as taught in U.S. Pat. No. 6,003,218 to Schumann et al., subject matter of which is incorporated herein by reference. By utilizing two elongated channels, the stacking process may be accomplished or completed twice as fast as compared to using a ladder station support assembly that provides only a pair of opposing left and right slat holders.

A disadvantage to both the U-shaped space presenter housing of the ladder-string applicators taught in U.S. Pat. No. 6,003,218 to Schumann et al. and the known U-shaped ladder support station (see FIGS. 1–6) is that they require routine maintenance. In particular, springs are utilized in conjunction with the opposing slat holders or spring clip ledges to bias the holders or clip ledges outward. Repetitive stacking cycles wear the springs out and the biased force becomes inconsistent as compared to desired specifications. Thus, the aforementioned devices must be periodically refurbished with new springs and other internal parts such as bushings. Each time one of the aforementioned devices has to be refurbished or replaced, the production line has to be stopped, which inhibits productivity. Moreover, the continuous refurbishment of the space presenter adds more expense to the manufacturing process. For a more comprehensive understanding, the prior art U-shaped ladder station support assembly will be discussed in greater detail in the Detailed Description section.

It would be desirable to provide a ladder station support assembly which is more reliable than the aforementioned U-shaped space presenter housings of the ladder-string applicator taught in U.S. Pat. No. 6,003,218 to Schumann et al. and the known U-shaped ladder support station (see FIGS. 1–6). An ideal ladder station support assembly would be inexpensive, have less parts, and require less maintenance. Moreover, it would be desirable to provide a ladder station support assembly which would be more durable and which can withstand more stacking cycles between routine maintenance. Furthermore, an ideal ladder station support assembly would be able to be integrated or retrofit into an existing assembly workstation or incorporated into new designs. Additionally, it would be advantageous to provide a level of articulation and adjustability to the ladder station support assembly that would allow the height of the opposing slat holder be adjusted to accommodate varying production run parameters.

SUMMARY OF THE INVENTION

According to an embodiment of the present invention, a ladder station supporting device is provided which includes an upper holder assembly having an upper mounting body and a first vertically-oriented holder rotatably fastened to the upper mounting body; a lower holder assembly including a lower mounting body and a second vertically-oriented holder rotatably fastened to the lower mounting body; and a vertically-oriented articulation rod interconnecting the upper and lower holder assemblies, wherein the upper holder assembly may be adjustably positioned along an axis defined by the articulation rod.

According to an aspect of the present invention, the upper and lower mounting body each have a vertically-oriented recess adapted to receive the respective first and second holder. The recess has a holder interface surface and a perimeter wall having a lower perimeter portion, an upper perimeter portion, and a side perimeter portion. According to another aspect of the present invention, the first and second holder each have a general rhomboid shape. In another aspect of the present invention, the first and second holder each have a stack supporting side, a resting side opposing the stack supporting side, a sliding edge side, and a stopping edge side opposing the sliding edge side.

According to other aspects of the present invention, the resting side is adapted to rest on the lower perimeter portion of the recess when the first or second holder is in a non-engaged state. Additionally, the resting side contacts the lower perimeter portion of the recess when the first or second holder supports a stack of slats. And yet another aspect of the present invention includes the first and second holder each being adapted to recede into the recess when a force is exerted on the sliding edge of the first or second holder. Furthermore, when the first or second holder is fully receded into the recess, the stopping edge of the first or second holder contacts the side perimeter portion of the recess.

Additionally, another embodiment of the present invention includes a ladder station support device which includes an upper holder assembly consisting of an upper mounting body, a first vertically-oriented holder, a first bolt for rotatably fastening the first holder to the upper body, and a first set screw; a lower holder assembly consisting of a lower mounting body, a second vertically-oriented holder, a second bolt for rotatably fastening the second holder to the lower body, and a second set screw; and an articulation rod interconnecting the upper and lower holder assemblies, wherein the upper holder assembly may be adjustably positioned along an axis defined by the articulation rod and secured thereto by the first set screw, and the lower holder assembly may be secured to a distal end of the articulation rod by the second set screw.

Another embodiment is provided which is an assembly machine for stacking blind slats in combination with a plurality of ladder station support devices installed onto a portion of the assembly machine. Each plurality of ladder station support devices includes a left and right support half. The left support half includes a left upper holder assembly including a left upper mounting body and a vertically-oriented first left holder rotatably fastened to the left upper mounting body; a left lower holder assembly including a left lower mounting body and a vertically-oriented second left holder rotatably fastened to the left lower mounting body; and a vertically-oriented left articulation rod interconnecting the left upper and lower holder assemblies, wherein the left upper holder assembly may be adjustably positioned along a first axis defined by the left articulation rod. The right support half includes a right upper holder assembly including a right upper mounting body and a vertically-oriented first right holder rotatably fastened to the right upper mounting body; a right lower holder assembly including a right lower mounting body and a vertically-oriented second right holder rotatably fastened to the right lower mounting body; and a vertically-oriented right articulation rod interconnecting the right upper and lower holder assemblies, wherein the right upper holder assembly may be adjustably positioned along a second axis defined by the right articulation rod. Furthermore, the left and right support halves are vertically aligned and laterally aligned with each other such that a left upper supporting side and left upper distal tip of the left upper holder is proximate to and aligned with a right upper supporting side and right upper distal tip of the right upper holder, and such that a left lower supporting side and left lower distal tip of the left lower holder is proximate to and aligned with a right lower supporting side and right lower distal tip of the right lower holder.

There are many advantages that the present invention has over existing prior art solutions. Overall, the present invention overcomes the aforementioned disadvantages by providing a ladder station support assembly which is simple and reliable. For instance, the present invention uses significantly less parts than the prior art. In particular, the present invention utilizes no springs or other internal moving parts. Therefore, the previously existing problem with respect to worn out springs and unevenly distributed biased springs is eliminated. The only parts that move in the production mode are the slat holders. This simple design results in a ladder station support which may be cycled more, and yet, requires less maintenance. Moreover, the present invention may be manufactured for significantly less (about fifty percent) than the previously described U-shaped ladder station support.

Furthermore, the ladder station support assembly is designed such that it may be retrofitted into an existing assembly station without any modification to the existing assembly station. Thus, the ladder station support assembly is considered a line replaceable unit which may be readily stored as a spare and easily installed into an assembly station when an existing ladder station support assembly (such as the prior art previously described) or the instant ladder station support assembly requires maintenance or replacement.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The Detailed Description will first provide a description of the prior art U-shaped ladder station support which is currently utilized in modular assembly stations. FIGS. 1 through 6 are provided to assist in the description of the prior art U-shaped ladder station support. Next, a detailed description of an exemplary embodiment of the present invention and various aspects thereof, will then be provided. FIGS. 7 through 12 are presented to assist in the description of the present invention.

DETAILED DESCRIPTION OF PRIOR ART

Figure 1:
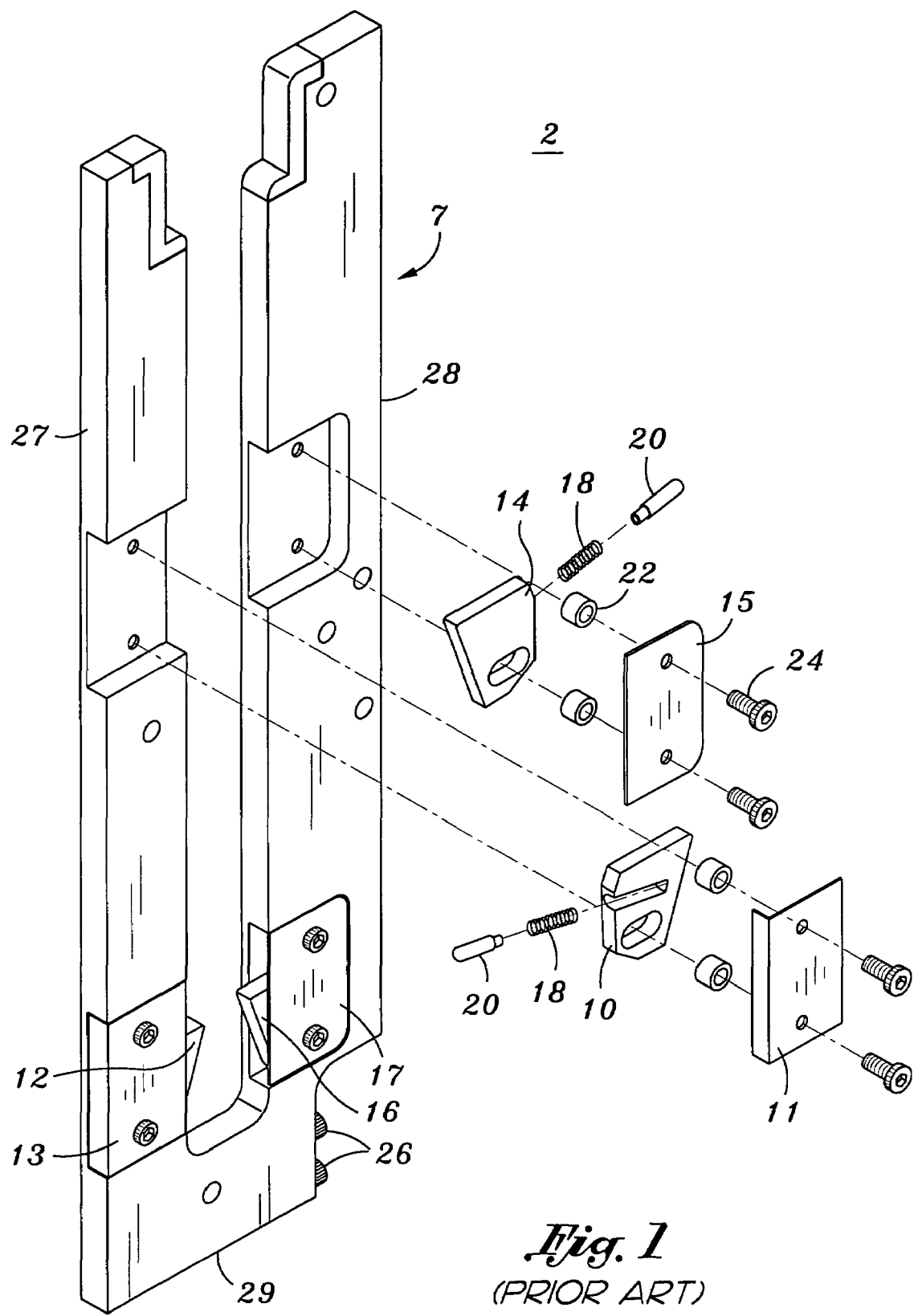
FIG. 1 shows a prior art U-shaped ladder station support assembly.

FIG. 1 is a perspective view of the prior art U-shaped ladder support assembly 2. The ladder support assembly 2 has a rigid U-shaped frame 7 comprising a left vertical frame portion 27, a right vertical frame portion 28, and lower cross member portion 29. The ladder support assembly 2 may be attached to the modular assembly station with mounting hardware 26, such as bolts. The ladder support assembly 2 has two pair of opposing left and right slat holders 10, 12, 14, 16. Each slat holder is part of an assembly further comprising a cover plate 11, 13, 15, 17, a spring 18, a pin 20, bushings 22, and bolts 24.

Figure 2:
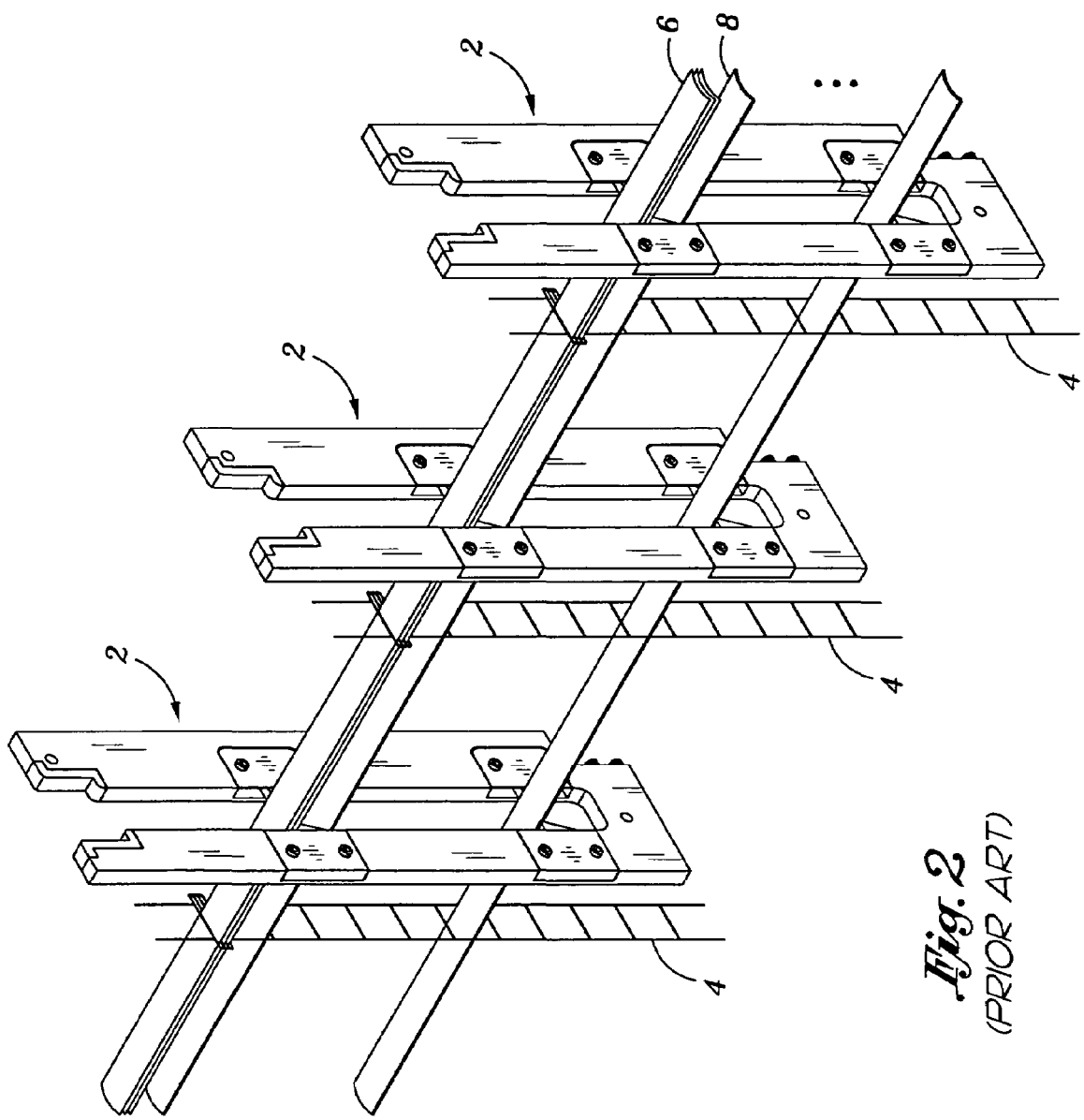
FIG. 2 shows a plurality of prior art U-shaped ladder station support assemblies (three places) configured such that they may be integrated into a modular assembly station.

FIG. 2 shows a plurality of prior art U-shaped ladder station support assemblies 2 (three places) configured as they would be integrated into a modular assembly station (not shown) which is utilized for assembling a plurality of slats for window blind units. The ladder station assemblies 2 are positioned laterally next to each other and are in alignment with one another such that the slats may be lifted through the opposing left and right slat holders and stacked by an elongated channel (not shown).

Figure 3:
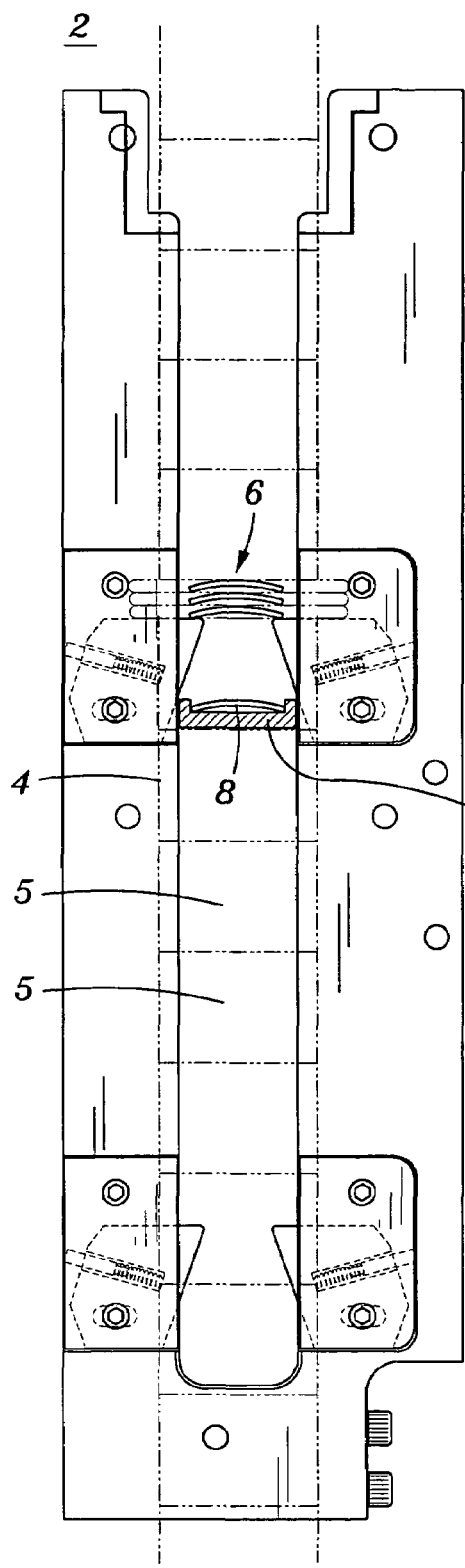
FIG. 3 is front perspective of a prior art U-shaped ladder station support assembly having three slats already inserted into ladder-string spaces and stacked, and another slat being lifted into the stack by an elongated channel.
Figure 4:
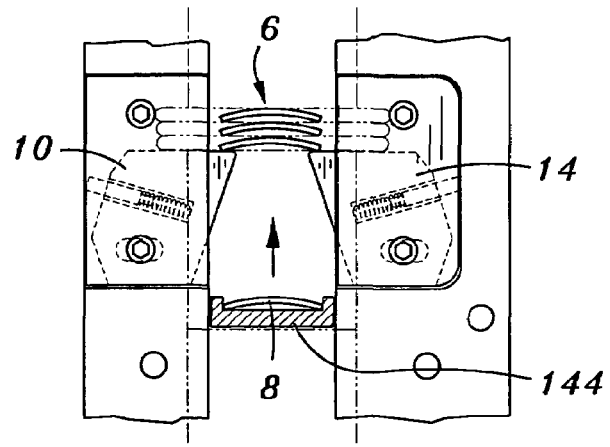
FIG. 4 is front perspective of the upper opposing left and right slat holders of the prior art U-shaped ladder station support assembly, which have three slats already inserted into ladder-string spaces and stacked, and another slat being lifted into the stack by an elongated channel.
Figure 5:
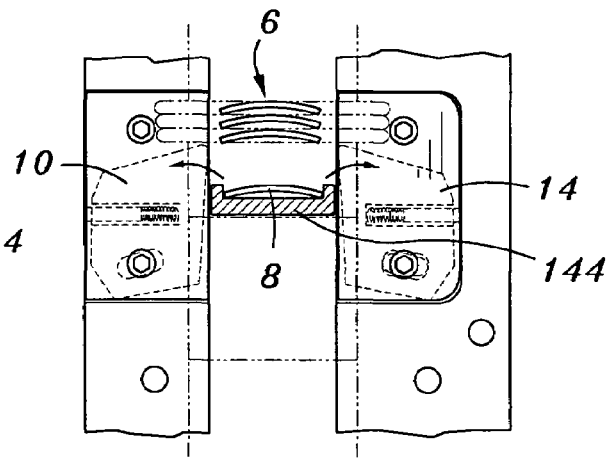
FIG. 5 is the same view as FIG. 4, except the elongated channel with a slat is being lifted through the upper opposing left and right slat holders.
Figure 6:
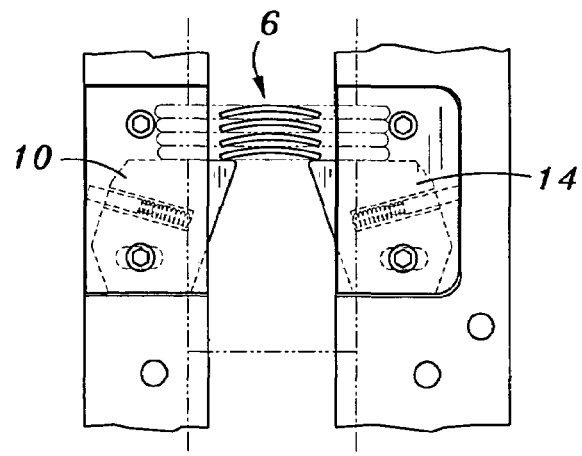
FIG. 6 is the same view as FIGS. 4 and 5, except the slat has been lifted through the upper opposing left and right slat holders, the elongated channel has been extracted, and the slat is now resting on the upper opposing left and right slat holders.

FIG. 3 is front perspective of a prior art U-shaped ladder station support assembly 2 having three slats already inserted into ladder-string spaces 5 (of ladder-string 4) and stacked, and another slat 8 being lifted into the stack 6 by an elongated channel 144. FIG. 4 is front perspective of the upper opposing left and right slat holders 10, 14 of the prior arc U-shaped ladder station support assembly 2, which has three slats already inserted into ladder-string spaces 5 and stacked, and another slat 8 being lifted into the stack 6 by an elongated channel 144. FIG. 5 is the same view as FIG. 4, except the elongated channel 144 with a slat 8 is being lifted through the upper opposing left and right slat holders 10, 14. FIG. 6 is the same as FIGS. 4 and 5, except the slat 8 has been lifted through the upper opposing left and right slat holders 10, 14, the elongated channel 144 has been extracted, and the slat 8 is resting on the upper opposing left and right slat holders 10, 14 and is now part of the stack 6.

General Description of Exemplary Embodiment of Ladder Station Support Assembly

Figure 7:
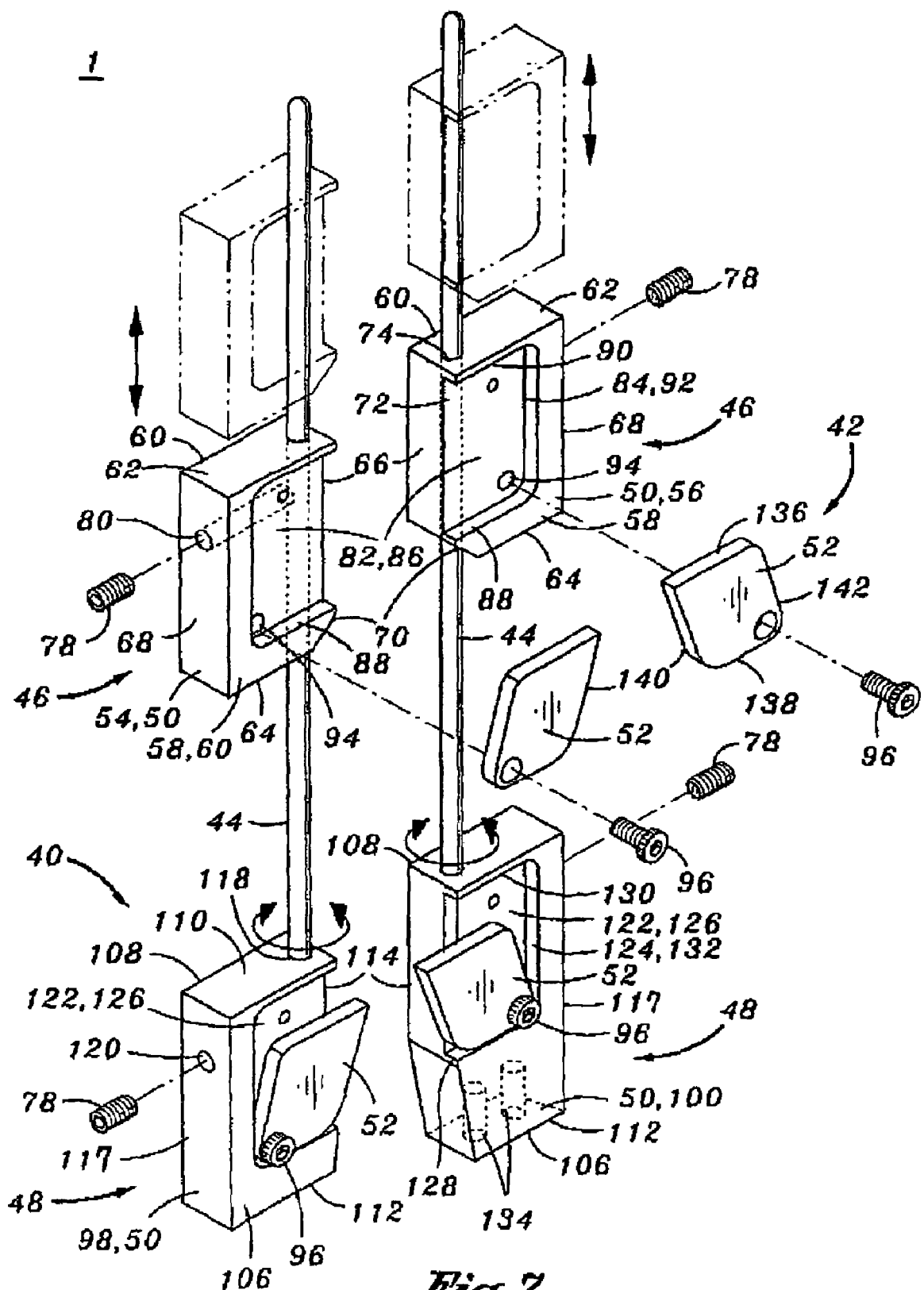
FIG. 7 shows an exemplary embodiment of a ladder station support assembly according to an aspect of the present invention.

The present invention is now described herein below. FIG. 7 shows an exemplary embodiment of the present invention which is a ladder station support assembly 1 including a left support half 40 and a right support half 42. Each support half 40, 42 includes at least three main components, including an articulation rod 44, an upper holder assembly 46, and a lower holder assembly 48.

The articulation rod 44 is preferably made from a high strength alloy, for instance, stainless steel. The length and diameter of the articulation rod 44 may vary according to the dimensions and size of the assembly station or stacking machine of which the support half 40, 42 is to be installed.

Both upper 46 and lower 48 holder assemblies have at least two main components, including a mounting body 50 and a slat holder 52. The mounting body 50 may be constructed of a variety of materials, such as metal (for example steel or aluminum), plastic, and resin material to name just a few exemplary materials. This material list is merely exemplary and is not intended to be limiting.

The slat holders 52 may be made from a variety of materials, such as plastic (i.e. polyethylene, polypropylene, TEFLON® (i.e., PTFE)) or metal (i.e. aluminum) to name just a few examples. This material list is merely exemplary and is not intended to be limiting. Preferably, the material utilized for manufacturing the slat holders 52 will exhibit sufficient rigidity and durability to withstand thousands of slat lifting cycles. However, preferably, the slat holder 52 is made from a material which reduces friction when the elongated channel 144 (see FIGS. 9–12) is brought into contact with the opposing slat holders 52.

Detailed Description of Left and Right Upper Mounting Bodies

The structure of the left 54 and right 56 upper holder assembly mounting body 50, as illustrated in FIGS. 7 through 12, is now herein described below. It is noted that the left upper mounting body 54 is a mirror image of the right upper mounting body 56. Therefore, for purposes of this description, the left and right upper holder assembly mounting bodies 54, 56 are generally referred to as upper mounting bodies 54, 56. The exemplary upper mounting body 54, 56 has a generally rectangular shape, however, the shape of the upper mounting body 54, 56 may conform to any other shapes which accomplish the same function. For descriptive purposes, the upper mounting bodies 54, 56 have a first holder adapting side 58, a first back side 60, a first upper side 62, a first lower side 64, a first holder deployment side 66, and a first set screw receiving side 68 which opposes the first holder deployment side 66. The mounting body 54, 56 may also have a first chamfered edge 70 at about 45 degrees where the first holder deployment side 66 and first lower side 64 meet.

Figure 9:
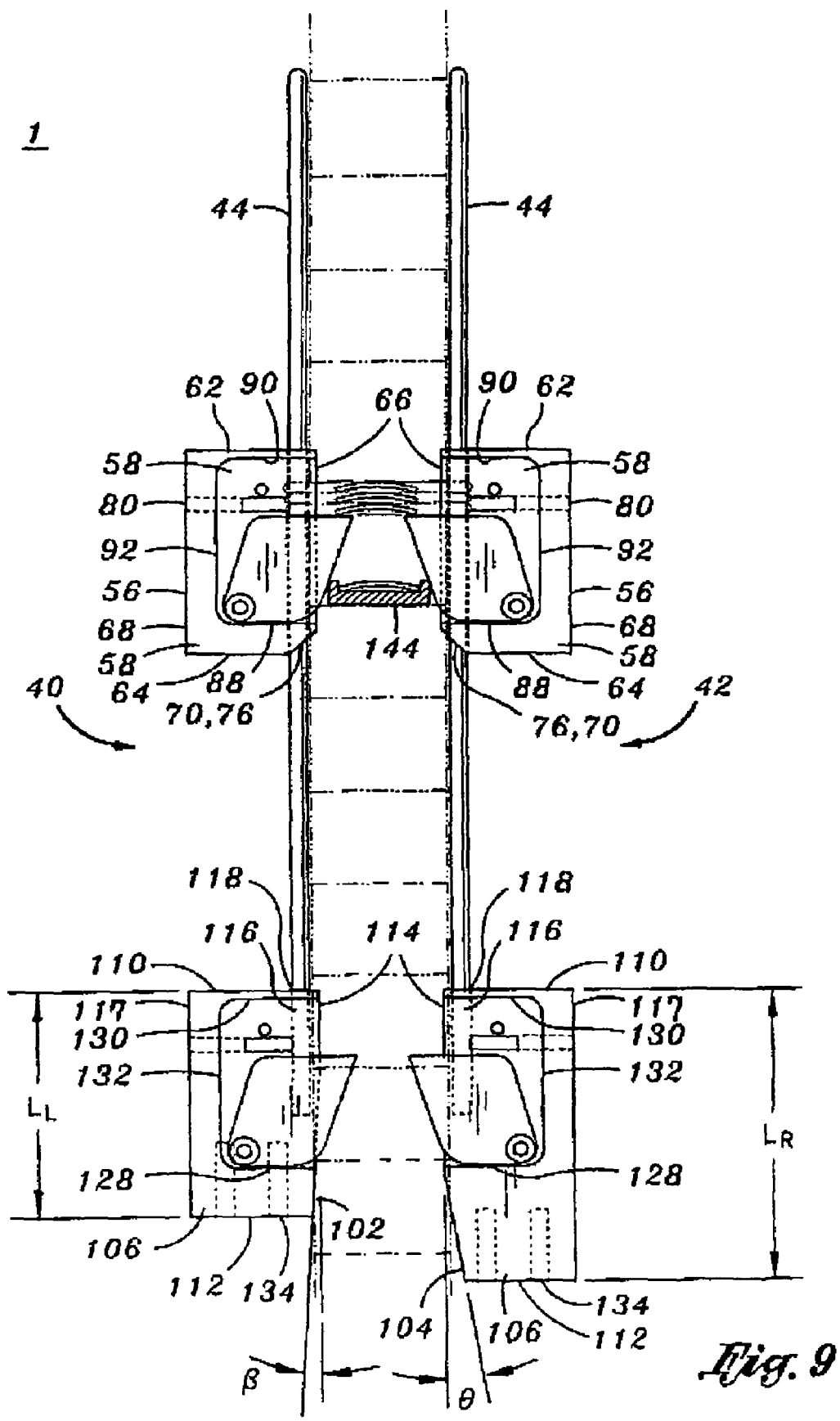
FIG. 9 is front perspective of the exemplary embodiment of a ladder station support assembly having three slats already inserted into ladder-string spaces and stacked, and another slat being lifted into the stack by an elongated channel, according to an aspect of the present invention.

The upper mounting body 54, 56 is provided with a first articulation bore 72 for receiving the articulation rod 44. The first articulation bore 72 is positioned lateral and parallel to the first holder deployment side 66. Thus, the first articulation bore 72 has a first upper bore opening on the first upper side 62, and a first lower bore opening 76 (not shown) on the first lower side 64. In the exemplary embodiment, the second bore 76 opening is substantially positioned on the first chamfered edge 70 as best illustrated in FIG. 9. The diameter of the first articulation bore 72 is slightly larger than the diameter of the articulation rod 44. Therefore, a sliding fit interface having relatively close tolerances is formed between the surface of the first articulation bore 72 and the outer surface of the articulation rod 44. This fastening interface provides axial (i.e. along the axial or longitudinal length of the rod 44) and radial (rotatably around the surface of the rod 44) adjustability between the upper holder assembly 46 and the articulation rod 44 as shown by the motion arrows in FIG. 7. A recessed set screw 78, such as an Allen head screw, is utilized to secure the articulation rod 44 within the upper mounting body 54, 56. In particular, a first set screw hole 80 having receiving threads is provided within the upper mounting body 54, 56. A first set screw hole 80 is oriented normal to and intersects the first articulation bore 72. Therefore, the set screw 78 may be tightened directly to surface of the articulation rod 44.

The upper mounting body 54, 56 has a first recess 82 formed or milled within the upper mounting body 54, 56 which is adapted to receive the slat holder 52. The first recess 82 is formed in the first holder adapting side 58 and the first holder deployment side 66 of the upper mounting body 54, 56, which results in a first perimeter wall 84 and a first holder interface surface 86 formed in the upper mounting body 54, 56. The first perimeter wall 84 has a first lower perimeter portion 88, a first upper perimeter portion 90, and a first side perimeter portion 92. The depth of the first recess is preferably sufficient to substantially accept the thickness of the slat holder 52. The length and width of the first recess 82 should be sufficient enough to allow the slat holder 52 to rotate a desired or specific range of upward and downward motion. The shape of the exemplary embodiment of the recess 82 (see FIGS. 7–12) is generally rectangular. However, the first recess 82 may have a variety of shape as long as it performs the same function. This aspect of the present invention will be described in greater detail later within the specification.

A first slat holder mounting hole 94 is provided in the upper body 54, 56 for mounting the slat holder 52. In particular, the first holder mounting hole 94 is positioned in a region of the lower corner of the first recess 82. The first holder mounting hole 94 is oriented normal to and offset from the articulation bore 72 and has receiving threads to accept a bolt 96 for fastening the slat holder 52. Preferably, the bolt 96 will have machine threads and have a head adapted to receive or Allen head wrench and also have knurled edges. The attachment of the slat holder 52 within the first recess 82 and the interaction of the slat holder 52 with respect to the first perimeter wall 84 and the first holder interface surface 86 will be described in further detail later in the specification.

Detailed Description of Left and Right Lower Mounting Bodies

The structure of the left and right lower holder assembly 48 mounting bodies 98, 100 are now herein described below. The left and right lower holder assembly mounting bodies 98. 100 are generally referred to as the lower mounting bodies 98, 100. For descriptive purposes, the lower body 98, 100 has a second holder adapting side 106, a second back side 108, a second upper side 110, a second lower side 112, a second holder deployment side 114, and a second set screw receiving side 117 which opposes the second holder deployment side 114. Moreover, the shape of the lower mounting body 98, 100 may conform to other shapes and forms that will perform the same function.

The exemplary lower mounting bodies 98, 100 shown in FIGS. 7 through 12 have a similar structural features to that of the upper mounting body 54, 56, however, the length $L_L$ of the left lower mounting body 98 (see FIG. 9) and length $L_R$ of the right lower mounting body 100 (see FIG. 9) may not the same with respect to each other in the exemplary embodiment. Furthermore, the chamfered edges 102, 104 on the lower body 98, 100 have different angles of inclination ($\beta$, $\theta$) as compared to the upper body 54, 56 which are about 45 degrees. In particular, the left lower mounting body 98 may have a left lower mounting body chamfered edge 102 with an angle of inclination representative of $\beta$ where the second holder deployment side 114 and second lower side meet 112. The left lower chamfered edge 102 may generally reach beyond about half-way upwards on the second holder deployment side 114. In a similar manner, the right lower mounting body 100 may have a right lower mounting body chamfered edge 104 with an angle of inclination representative of $\theta$ where the second holder deployment side 114 and second lower side meet 112. The right lower chamfered edge 104 may reach to generally about at the second lower perimeter wall portion 128 begins. The aforementioned structural features are provided such that mounting bodies 98, 100 may be adapted to and fastened to mounting structure of the modular assembly station (not shown). However, it is noted that mounting bodies 98, 100 may conform to various shapes and sizes which perform the same function, and therefore, should not be limited to the exemplary shapes herein described.

The lower mounting body 98, 100 has a second articulation bore 116 (see FIG. 9) for receiving the articulation rod 44. The second articulation bore 116 is positioned lateral and parallel to the second holder deployment side 114. The second articulation bore 116 has a second upper bore opening 118 on the second upper side 110. In the exemplary embodiment shown in FIGS. 7 through 12, the second articulation bore 116 dead heads generally at about half the length of the second holder deployment side 114 (see FIG. 9). Thus, the exemplary embodiment does not incorporate a second lower bore opening, however, an alternative embodiment may utilize a second lower bore opening (not shown). The diameter of the second articulation bore 116 is slightly larger than the diameter of the articulation rod 44. Therefore, a sliding fit interface is formed between the surface of the second articulation bore 116 and the outer surface of the articulation rod 44. This fastening interface provides radial (rotatably around the surface of the rod) adjustability about the articulation rod 44. A recessed set screw 78, such as an Allen head screw, is utilized to secure the rod 44 within the lower mounting body 98, 100. In particular, a second set screw hole 120 having receiving threads is provided in the lower mounting body 98, 100 and is oriented normal to and intersects the second articulation bore 116. Therefore, the set screw 78 may be tightened directly to surface of the articulation rod 44.

The lower mounting body 98, 100 has a second recess 122 formed or milled within the lower mounting body 98, 100 which is adapted to receive the slat holder 52. The exemplary embodiment of the second recess shown in FIGS. 7 through 12 has a generally rectangular shape. The second recess 122 is formed in the second holder adapting side 106 and the second holder deployment side 114 of the lower mounting body 98, 100, which results in a second perimeter wall 124 and a second holder interface surface 126 formed in the lower mounting body 98, 100. The second perimeter wall 124 has a second lower perimeter portion 128, a second upper perimeter portion 130, and a second side perimeter portion 132. The depth of the second recess is preferably sufficient to substantially accept the thickness of the slat holder 52. The length and width of the second recess 122 should be sufficient enough to allow the slat holder 52 to have desired or specific range of upward and downward motion. This aspect of the present invention will be further discussed later in the specification.

A second holder mounting hole (not shown) is provided in the lower body 98, 100 for mounting the slat holder 52. In particular, the second holder mounting hole is positioned in a region of the lower corner of the second recess 122. The second holder mounting hole is oriented normal to and offset from the second articulation bore 116 and has receiving threads to accept a bolt 78 for fastening the holder. Preferably, the bolt 78 will have machine or fine threads, and have a head adapted to receive an Allen head wrench, and also have knurled edges. The attachment of the slat holder 52 within the second recess 122 and the interaction of the slat holder 52 with respect to the second perimeter wall 124 and the second holder interface surface 126 will be described in further detail later in the specification.

The lower mounting body 98, 100 further includes a plurality of mounting bores 134 adapted to rigidly fasten each support half 40, 42 to the modular assembly station or stacking machine. In the exemplary embodiment, a pair of mounting bores 134 are provided in the second lower surface 112. Other various bolt patterns may also be utilized in other embodiments. Moreover, each support half 40, 42 may be fastened to an assembly station or stacking device in other manners of which one of ordinary skill in the art would implement.

Holder Description and Dynamics of Holder within Mounting Body Recess

Figure 10:
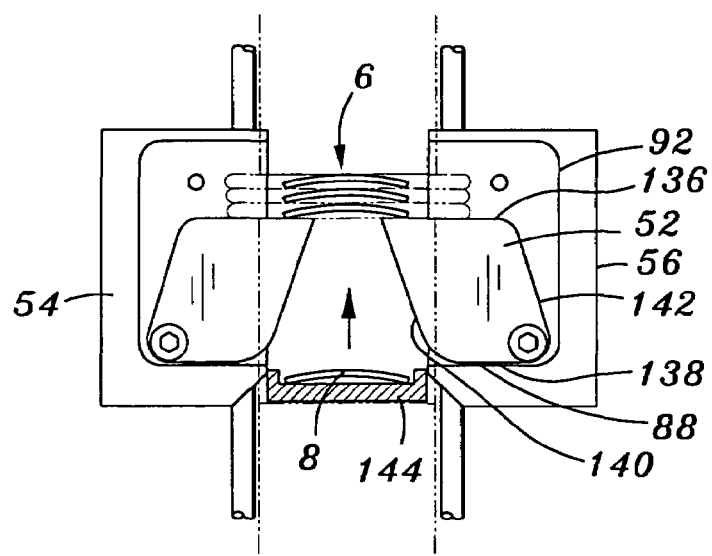
FIG. 10 is front perspective of the upper opposing left and right slat holders of the exemplary embodiment of the ladder station support assembly, which has three slats already inserted into ladder-string spaces and stacked, and another slat being lifted into the stack by an elongated channel, according to an aspect of the present invention.
Figure 11:
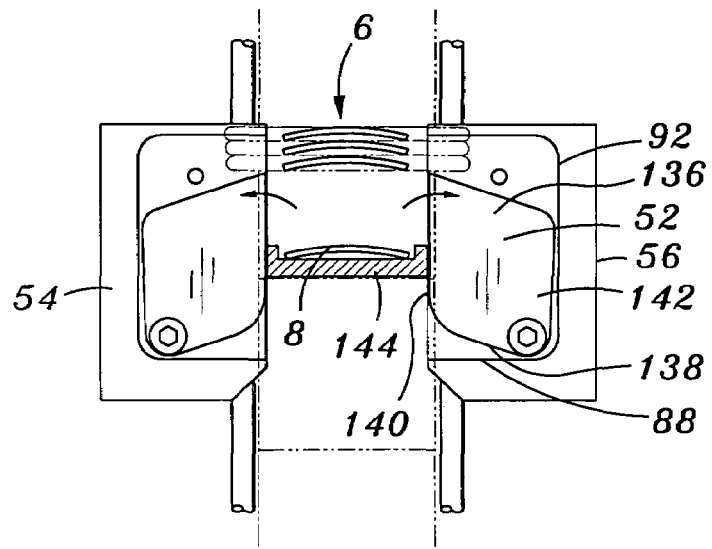
FIG. 11 is the same view as FIG. 10, except the elongated channel with a slat is being lifted through the upper opposing left and right slat holders, according to an aspect of the present invention.
Figure 12:
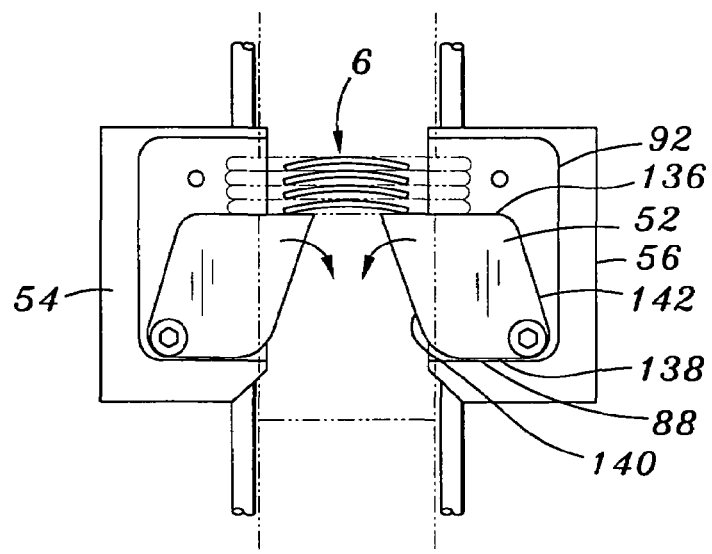
FIG. 12 is the same view as FIGS. 10 and 11, except the slat has been lifted through the upper opposing left and right slat holders, the elongated channel has been lowered, and the slat is resting on the upper opposing left and right slat holders, according to an aspect of the present invention

The following section now describes various aspects of slat holder 52. This description applies to both the upper and lower holder assemblies 46, 48, and thus, a general description is provided which is applicable to each mounting body 50 and slat holder 52. Each slat holder 52 has four sides and has a generally parallelogram shape, in particular, a rhomboid shape. However, the rhomboid-shaped slat holder 52 may not be a perfect parallelogram or rhomboid. For descriptive purposes, the slat holder 52 has a lifting side 136 (see FIGS. 10–12), a resting side 138 which opposes the lifting side 136, a sliding edge side 140 and a stopping edge side 142 which opposes the sliding edge side 140. For the shown exemplary embodiment of the slat holder 52, the lifting side 136 is slightly longer than the resting side 138. The lifting side 136 is used as a rest for the stack of blinds 6 as shown in FIGS. 9 through 12. The sliding edge side 140, is preferably smooth, and is the side of which the elongated channel 144 is contacts while lifting the slat 8 up into the slat stack 6. The resting side 138 of the slat holder 52 contacts the lower perimeter side 88, 128 when the slat holder 52 is in a resting position as shown in FIGS. 10 and 12. The stopping edge side 142 contacts the side perimeter wall 92, 132 when the slat holder 52 is pushed upward inside the recess 82, 122 by the elongated channel 144 when it is lifted through the opposing left and right slat holders 52 as shown in FIG. 11.

The slat holder 52 is rotatably attached by the bolt 78 such that the slat holder 52 may freely move from its resting position (see FIGS. 9, 10, 12) to the pushed up position (see FIG. 11). It is noteworthy to mention that the present invention utilizes no springs or resilient-biased elements to assist in actuating the slat holder 52 which reduces the number of parts of which are subject to wear and tear. Thus, the slat holder 52 in the present invention is designed such that it may be easily pushed upward with minimal resistance by the elongated channel 144 that is lifting the slat 8. Furthermore, the slat bolder 52 falls back to the resting position (see FIGS. 9, 10, 12) without utilizing a spring such as in the prior art device. The feature is accomplished by providing a slat holder 52 which has a center of gravity offset from the axis of which it rotates about, the axis of which is defined by the centerpoints of holder mounting hole 94 and bolt 96. As a result, once the elongated channel 144 with the slat 8 passes through the pair of opposing slat holders 52, the slat holders 52 swing downward until the resting side 142 of the slat holder 52 contacts the lower perimeter wall 88, 128 (see FIGS. 9, 10, 12).

Integration of Ladder Station Support Assemblies into Assembly Station

Figure 8:
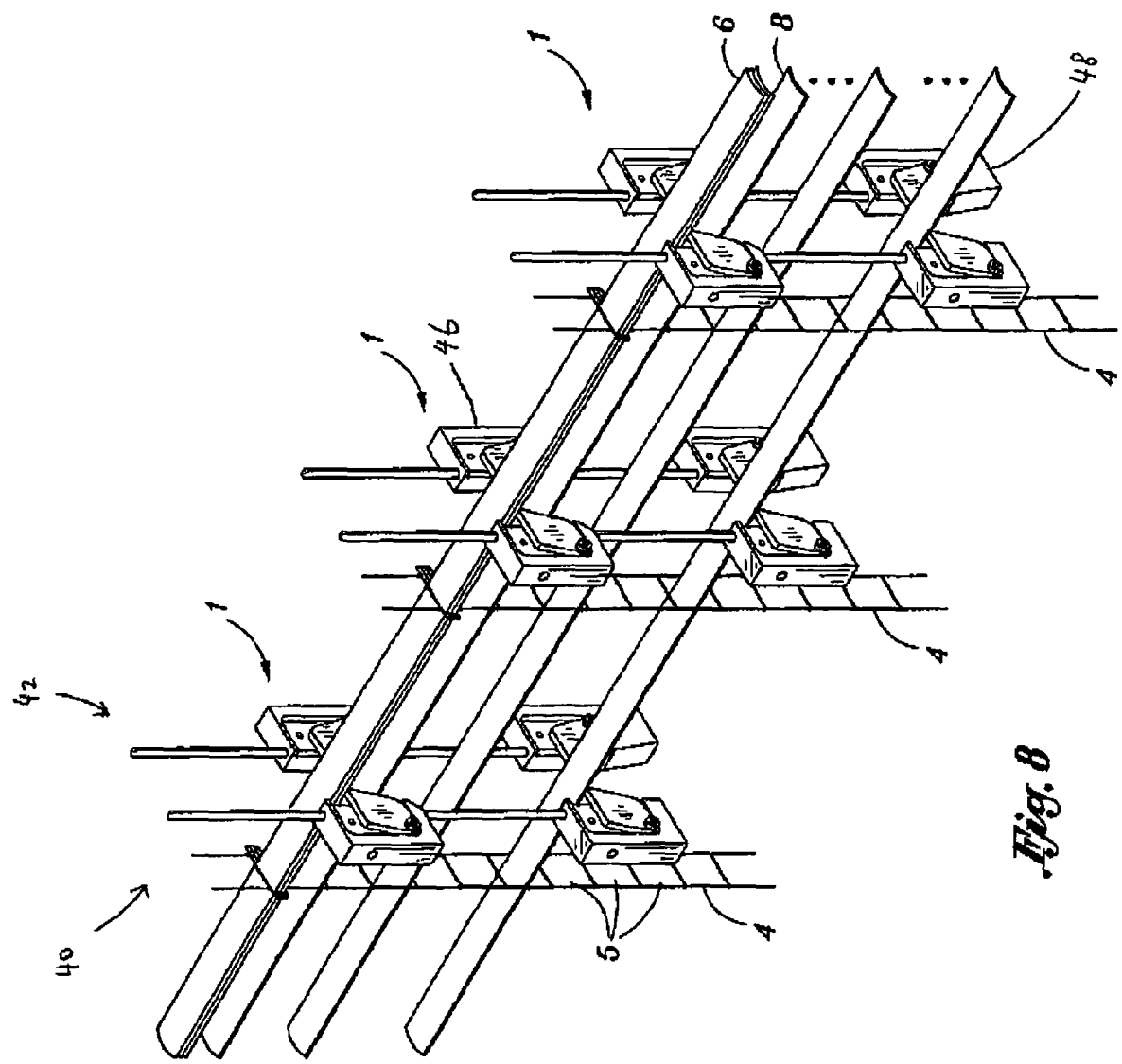
FIG. 8 shows a plurality of the ladder station support assemblies (three places) configured such that they may be integrated into a modular assembly station, according to an aspect of the present invention.

As shown in FIG. 8, a plurality of ladder station support assemblies 1 are typically utilized together when assembling window blind units. In particular, the plurality of vertically-oriented ladder station support assemblies 1 are positioned in line with each other such that a row a left support halves 40 are in alignment and such that a row of right support halves 42 are in alignment. The upper holder assemblies 46 (i.e., both left and right) should be adjusted to the same height on each respective articulation rod 44.

It is noteworthy to mention that present invention may be adapted or integrated into a variety of assembly stations or stacking machines, and is not limited to only usage in assembly machines utilized for manufacturing blinds. Thus, the scope of the present invention should not be limited to blind stacking machines.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed:

1. A ladder station support device comprising:
  an upper holder assembly comprising an upper mounting body and a first holder rotatably fastened to said upper mounting body;

a lower holder assembly comprising a lower mounting body and a second holder rotatably fastened to said lower mounting body;

a vertically-oriented articulation rod interconnecting said upper and lower holder assemblies, wherein the upper holder assembly may be adjustably positioned along an axis defined by said articulation rod; and wherein said first and second holder each having a general rhomboid shape.

2. The device according to claim 1, said upper and lower mounting body each having a vertically-oriented recess adapted to receive said respective first and second holder, said recess having a holder interface surface and a perimeter wall having a lower perimeter portion, an upper perimeter portion, and a side perimeter portion.

3. The device according to claim 1, said first and second holder each having a stack supporting side, a resting side opposing said stack supporting side, a sliding edge side, and a stopping edge side opposing said sliding edge side.

4. The device according to claim 3, wherein said resting side is adapted to contact and rest on said lower perimeter portion of the recess when said first or second holder is in a non-engaged state.

5. The device according to claim 3, wherein said resting side contacts said lower perimeter portion of said recess when said first or second holder supports a stack of slats.

6. The device according to claim 3, wherein said first and second holder are each adapted to recede into the recess when a force is exerted on said sliding edge of said first or second holder.

7. The device according to claim 6, wherein when said first or second holder is fully receded into the recess, said stopping edge of said first or second holder contacts said side perimeter portion of the recess.

8. A ladder station support device comprising:

an upper holder assembly consisting of an upper mourning body, a first holder, a first bolt for rotatably fastening said first holder to said upper body, and a first set screw;

a lower holder assembly consisting of a lower mounting body, a second holder, a second bolt for rotatably fastening said second holder to said lower body, and a second set screw; and a vertically-oriented articulation rod interconnecting said upper &id lower holder assemblies, wherein said upper holder assembly may be adjustably positioned along an axis defined by said articulation rod and secured thereto by said first set screw, and said lower holder assembly may be secured to a distal end of said articulation rod by said second set screw.

9. The device according to claim 8, said upper and lower mounting body each having a vertically-oriented recess adapted to receive said respective first and second holder, the recess having a holder interface surface and a perimeter wall having a lower perimeter portion, an upper perimeter portion, and a side perimeter portion.

10. The device according to claim 9, said first and second holder each having a stack supporting side, a resting side opposing said stack supporting side, a sliding edge side, and a stopping edge side opposing said sliding edge side.

11. The device according to claim 10, wherein said resting side is adapted to rest on said lower perimeter portion of the recess when said first or second holder is in a non-engaged state.

12. The device according to claim 11, wherein said resting side contacts said lower perimeter portion of the recess when said first or second holder supports a stack of slats.

13. The device according to claim 11, wherein said first and second holder are each adapted to recede into the recess when a force is exerted on said sliding edge of said first or second holder.

14. The device according to claim 13, wherein when said first or second holder is fully receded into the recess, said stopping edge of said first or second holder contacts said side perimeter portion of the recess.

15. The device according to claim 8, said first and second holder each having a general rhomboid shape.

16. A ladder station support device comprising:

an upper holder assembly comprising an upper mounting body and a first holder rotatably fastened to said upper mounting body;

a lower holder assembly comprising a lower mounting body and a second holder rotatably fastened to said lower mounting body;

a vertically-oriented articulation rod interconnecting said upper and lower holder assemblies, wherein the upper holder assembly may be adjustably positioned along an axis defined by said articulation rod;

wherein said upper and lower mounting body each having a vertically-oriented recess adapted to receive said respective first and second holder; and wherein said recess having a holder interface surface and a perimeter wall having a lower perimeter portion, an upper perimeter portion, and a side perimeter portion.

* * * * *